United States Patent [19]

Sutula

[11] 4,026,725
[45] May 31, 1977

[54] BATTERY ELECTROLYTE

[75] Inventor: Raymond A. Sutula, Laurel, Md.

[73] Assignee: The United States of America as represented by the Secretary of the Navy, Washington, D.C.

[22] Filed: July 24, 1973

[21] Appl. No.: 385,926

[52] U.S. Cl. .............................. 429/52; 429/112; 429/191

[51] Int. Cl.$^2$ ........................................ H01M 6/36

[58] Field of Search .......... 136/83 T, 90, 153, 155, 136/156; 252/518, 521; 149/87, 109

[56] References Cited

UNITED STATES PATENTS

| | | | |
|---|---|---|---|
| 3,567,516 | 3/1971 | Rightmire et al. | 136/83 T |
| 3,607,417 | 9/1971 | McRae et al. | 136/153 |
| 3,759,749 | 9/1973 | Voyentzie et al. | 136/83 T |
| 3,811,948 | 5/1974 | Bald, Jr. | 136/83 T |

*Primary Examiner*—Verlin R. Pendegrass
*Attorney, Agent, or Firm*—R. S. Sciascia; A. L. Branning; R. D. Johnson

[57] ABSTRACT

A method of activating a battery containing an alkali metal halide electrolyte comprising placing a powdered alkali metal carbide selected from the group consisting of lithium carbide, sodium carbide, potassium carbide, rubidium carbide, cesium carbide, and mixtures thereof into contact with the alkali metal halide electrolyte and then contacting the powdered alkali metal carbide with a halogen gas selected from the group consisting of fluorine, chlorine, and mixtures thereof.

16 Claims, No Drawings

BATTERY ELECTROLYTE

BACKGROUND OF THE INVENTION

This invention relates generally to batteries and more particularly to methods of activating molten salt electrolyte batteries.

A molten salt electrolyte battery is activated by transforming the electrolyte from its non-conductive solid state to its generally highly conductive molten state, where the conduction is in the form of anion and cation migration. To activate the battery, heat must be provided to melt and heat the electrolyte to the operating temperature of the battery. Further, depending on the particular battery, additional heat must be provided for heating other parts of the battery as well as for compensating for heat losses.

One approach to heating the electrolyte is the use of an external heating source, for example electrical heating elements. However, external heating means are more expensive, complex heavy and bulky than self-contained chemical starters.

Another approach is to use chemical combustion charges which melt the solid electrolyte. However, most of these chemicals (e.g. iron-potassium perchlorate) require a shock to a percussion cap or an electric spark to cause ignition.

Attempts have been made to eliminate the need for a spark or percussion cap. One method attempted was to cause the melting of the electrolyte by contacting chlorine with a mixture of the solid electrolyte and powdered lithium metal, but it was found that the reaction between chlorine and powdered lithium is not self sustaining at room temperature because of the formation of a protective layer of lithium chloride on the surfaces of the lithium particles. Moreover, while the addition of a potassium powder initiator apparently resulted in a more complete start-up reaction, the results were not sufficiently reproducible to demonstrate the practicability of that method. Further, the potassium had the disadvantage of not completely reacting with chlorine gas until the metal was at or above its melting point (60.3° C).

SUMMARY OF THE INVENTION

Accordingly, one objective of this invention is to provide a means for activating a battery.

Another objective of this invention is to provide a self-contained activating means for a molten salt electrolyte alkali metal-halogen gas battery.

A further object of this invention is to eliminate the need for external heating sources to melt and heat the solid alkali halide electrolyte in alkali metal-halogen gas batteries.

Still another object of this invention is to melt the electrolyte of a battery and heat it and other parts of the battery to the operating temperature of the battery.

Yet another object of the invention is to provide a combustible composition for melting and heating solid electrolytes that can be ignited without the use of a percussion cap or a spark.

Yet a further object of this invention is to provide an ignition mixture which reacts spontaneously with chlorine gas at low temperature (0° C).

A still further object of this invention is to provide an ignition mixture which reacts completely with chlorine gas at low temperatures (0° C).

Still another object of this invention is to provide combustible materials which produce waste products which are compatible with the electrolyte.

These and other objects of this invention are accomplished by providing a method comprising placing a powdered alkali metal carbide selected from the group consisting of lithium carbide, sodium carbide, potassium carbide, rubidium carbide, cesium carbide and mixtures thereof into contact with the solid alkali halide electrolyte and then contacting the alkali metal carbide with a halogen gas selected from the group consisting of fluorine, chlorine, and mixtures thereof.

DESCRIPTION OF THE PREFERRED EMBODIMENT

The alkali metal carbides used in this invention should be powdered to increase the surface area exposed to the halogen gas and thus increase the rate of reaction.

Another factor to consider is the purity of the alkali metal carbides used. If these carbides contain too many impurities the reaction with chlorine will proceed poorly or not at all. Therefore, it is preferred that the purest alkali metal carbides available be used. For example, lithium carbide is available in about 80 percent purity. The sodium carbide used in the examples was analyzed and found to be 98.6 percent pure.

Sodium carbide offers the advantage of reacting spontaneously with chlorine at low temperatures (0° C). Moreover, sodium carbide can be used in combination with other alkali metal carbides or lithium metal to provide mixtures which will also spontaneously ignite with chlorine gas at low temperatures (0° C). Further, these carbides also react with fluorine.

The proportion of alkali metal carbide to electrolyte must be great enough to melt the electrolyte and heat the electrolyte and certain other parts of the battery to the operating temperature of the battery. The proportion of carbide to electrolyte needed can be calculated from the heat of reaction of the alkali metal carbide with the halogen, the heats of fusion and the specific heats of the products and of the electrolyte, and specific heat and the heat losses of the particular battery used.

The proportion of alkali metal carbide which can be used is limited by the fact that when the carbon content of the electrolyte exceeds about 27 percent by weight the cells are likely to short out. Preferably the proportion of alkali-metal carbide to electrolyte should be selected to produce, on combustion of the carbide, a carbon content of less than 10 percent by weight. One skilled in the art can predict the percentage of carbon which a given proportion of akali metal carbide to electrolyte will produce by considering the reaction $M_2C_2 + Cl_2 \rightarrow 2MCl + 2C$ wherein M is selected from the group consisting of Li, Na, K, Rb, and Cs.

In summary, the lower limits of the proportion of alkali metal carbide to alkali metal halide electrolyte is determined by the heat needed to melt the alkali metal halide electrolyte and to heat the electrolyte and certain other parts of the battery to the operating temperature of the battery; which other parts of the battery will depend on the particular battery used. On the other hand, the upper limit is determined by the permissible percentage by weight of carbon in the final molten electrolyte mixture. The proportion should be from about 10 to about 80 percent by weight alkali metal carbide, but preferably from about 10 to about 30 percent by weight alkali metal carbide. Therefore, the proportion of alkali metal halide electrolyte should be from about 20 to about 90 percent by weight but preferably from about 70 to about 90 percent by weight.

A three layer system comprising (1) a pile of sodium carbide contacting (2) a sodium carbide-lithium metal mixture contacting (3) an alkali metal halide electrolyte can be used to generate more heat while producing less carbon than a system composed of just alkali metal carbides and alkali metal electrolytes. In the three layer system, the pile of sodium carbide ignites upon contact with the chlorine, generating enough heat to ignite the sodium carbide-lithium metal mixture. The heat generated by the reaction of the sodium carbide and lithium metal with chlorine melts the alkali metal halide electrolyte and heats the electrolyte and other parts of the battery to the operating temperature of the battery. The advantage of using lithium metal in this system is that it produces no carbon, thus reducing the percentage by weight of carbon in the final melt.

In this three layer system, the percentage by weight of each of the components must be selected so that enough heat is generated to activate the battery without producing so much carbon that the battery shorts out. The sodium carbide layer or pile can comprise from more than zero to less than about 80 percent by weight of the total three layer composition, but preferably from more than zero to about 30 percent by weight. However, a minimum of about 0.300 gms of sodium carbide is required to ignite the sodium carbide-lithium metal layer. After ignition the reaction between the sodium carbide-lithium metal mixture and $Cl_2$ is self-sustaining provided that sodium carbide constitutes at least about 40 percent by weight of the mixture. In other words, sodium carbide should constitute from about 40 to less than 100 percent by weight of the sodium carbide-lithium metal mixture layer with lithium metal making up the balance of the mixture. Finally, the sodium carbide-lithium metal mixture layer can comprise from more than zero to about 80 percent by weight of the total composition, but preferably from more than zero to about 30 percent by weight. The alkali metal halide electrolyte layer can comprise from about 20 to about 90 percent by weight of the total three layer composition, but preferably from about 70 to about 90 percent by weight. The carbon content of the total composition of all three layers must not exceed about 27 percent by weight or the battery is likely to short out; preferably carbon should constitute less than about 10 percent by weight of the total composition.

Note that care should be taken to keep the temperature of the lithium anode below about 500° C during the start up of the battery to prevent the direct reaction of the anode with chlorine gas. In cases where this was not done, enough heat was often generated during the starting process to also ignite the lithium anode.

Finally, direct substitution reactions will occur where the gas is a more reactive halogen than the anions of the electrolyte salt. Thus, when it is desirable to avoid these replacement reactions, it will be preferable to use only fluorides as electrolytes when fluorine gas is used and only fluorides, chlorides, or mixtures thereof as electrolytes when chlorine gas is used.

The general nature of the invention have been set forth, the following examples are presented as specific illustrations thereof. It will be understood that the invention is not limited to these specific examples but is susceptible to various modifications that will be recognized by anyone of ordinary skill in the art.

EXAMPLE I

Sodium carbide, 0.200 grams, was exposed to chlorine gas at 25° C. As soon as the chlorine came into contact with the sodium carbide, spontaneous reaction between the chlorine and sodium carbide took place evolving heat and light. The reaction time was less than ten seconds. Analysis after the test showed that all of the sodium carbide had been consumed in the reaction with chlorine.

EXAMPLE II

Sodium carbide, 0.342 grams, (−80 + 200 mesh) was exposed to chlorine gas at 0° C. As soon as the chlorine came into contact with the sodium carbide, a spontaneous reaction between the chlorine and sodium carbide took place. Analysis after the test showed that the sodium carbide had been consumed in the reaction with chlorine. The reaction time was less than 10 seconds.

EXAMPLE III

Sodium carbide, 0.025 grams, was placed on top of 0.200 grams of lithium carbide (−100 mesh) and exposed to chlorine gas at 25° C, and an immediate reaction between the sodium carbide-lithium carbide and the chlorine gas took place. The reaction was spontaneous and complete.

EXAMPLE IV

Lithium powder, 0.100 grams, 0.129 grams of sodium carbide were mixed together and contacted with chlorine gas at 25° C. The reaction between the sodium carbide-lithium mixture and the chlorine gas was spontaneous and virtually complete. Analysis after the experiment showed that a small quantity of lithium metal had not reacted with the chlorine.

EXAMPLE V

A mixture of 0.408 grams of sodium carbide and 0.621 grams of lithium metal was placed on top of 1.860 grams of lithium chloride. Sodium carbide, 0.300 grams, was placed on top of the sodium carbide-lithium metal mixture and then the entire composition was exposed to chlorine gas at 25° C. The reaction was spontaneous and violent and all of the electrolyte was melted.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In a lithium metal-chlorine gas battery comprising (1) a housing, (2) a lithium metal anode, (3) a cathode, and (4) an electrolyte which is an electrically nonconductive solid before the battery is activated but is an electrically conductive molten alkali halide salt after the battery is activated, the improvement comprising:
   A. the electrolyte before activation of the battery comprising:
      i. from about 10 to about 80 percent by weight of a powdered alkali metal carbide selected from the group consisting of (1) sodium carbide and (2) a mixture of sodium carbide and a carbide selected from the group consisting of (a) lithium carbide, (b) potassium carbide, (c) rubidium carbide, (d) cesium carbide and (e) mixtures thereof;

ii. from about 20 to about 90 percent by weight of a alkali metal halide of the formula $M^+X^-$ wherein M is selected from the group consisting of Li, Na, K, Rb, Cs, and mixtures thereof, and X is selected from the group consisting of F, Cl, and mixtures thereof, the alkali metal halide contacting the powdered alkali metal carbide;

provided that after the battery is activated, the carbon in the electrolyte does not exceed 27 percent by weight;

B. means for activating the battery by supplying chlorine gas to react with the powdered alkali metal carbide, the reaction between the chlorine gas and the alkali metal carbide generating heat to melt the electrolyte and producing products which are compatible with the electrolyte.

2. The battery of claim 1 wherein the alkali metal carbide is selected from the group consisting of (1) sodium carbide and (2) a mixture of sodium carbide and lithium carbide.

3. The battery of claim 1 wherein the alkali metal carbide constitutes from about 10 to 30 percent, and the alkali metal halide from about 70 to 90 percent of the electrolyte before activation of the battery.

4. The battery of claim 2 wherein the alkali metal carbide, constitutes from about 10 to about 30 percent and the alkali metal halide from about 70 to about 90 weight percent of the electrolyte before activation of the battery.

5. The battery of claim 4 wherein the alkali metal carbide is sodium carbide.

6. The battery of claim 1 wherein X is Cl.
7. The battery of claim 2 wherein X is Cl.
8. The battery of claim 3 wherein X is Cl.
9. The battery of claim 4 wherein X is Cl.

10. In a lithium metal-chlorine gas battery comprising (1) a housing, (2) a lithium metal anode, (3) a cathode, and (4) an electrolyte which is an electrically nonconductive solid before the battery is activated but is an electrically conductive molten alkali halide salt after the battery is activated, the improvement comprising:

A. the electrolyte before activation of the battery comprising:

i. from about 20 to about 90 percent by weight of an alkali metal halide of the formula $M^+X^-$ wherein M is selected from the group consisting of Li, Na, K, Rb, Cs and mixtures thereof, and X is selected from the group consisting of F, Cl, and mixtures thereof;

ii. from more than zero to about 80 percent by weight of a powdered sodum carbide-powdered lithium metal mixture contacting said alkali metal halide, wherein sodium carbide comprises from about 40 to less than 100 percent by weight of the powdered sodium carbide-powdered lithium metal mixture, and lithium metal comprises the balance of the powdered sodium carbide-powdered lithium metal mixture;

iii. from more than zero to less than 80 percent by weight of powdered sodium carbide contacting the powdered sodium carbide-powdered lithium metal mixture, provided that at least 0.300 grams of said sodium carbide is present; and further provided that after the battery has been activated, the carbon in the electrolyte does not exceed 27 percent by weight;

B. means for activating the battery by supplying chlorine gas to react with the sodium carbide and the powdered sodium carbide-powdered lithium metal mixture, the reactions between chlorine and sodium carbide and between chlorine and lithium metal generating heat to melt the electrolyte and producing products which are compatible with the electrolyte.

11. The battery of claim 10 wherein the alkali metal halide comprises from about 70 to about 90 percent by weight, the powdered sodium carbide-powdered lithium metal mixture comprises from more than zero to about 30 percent by weight, and the sodium carbide (iii) comprises from more than zero to about 30 percent by weight of the electrolyte before activation of the battery.

12. The battery of claim 10 wherein X is Cl.
13. The battery of claim 11 wherein X is Cl.
14. The battery of claim 11 wherein the sodium carbide (iii) is piled at one point on the sodium carbide-lithium metal mixture.

15. A method of activating a lithium metal-chlorine gas battery comprising:

placing a powdered alkali metal carbide selected from the group consisting of (1) sodium carbide and (2) a mixture of sodium carbide and a carbide selected from the group consisting of (a) lithium carbide, (b) potassium carbide, (c) rubidium carbide, (d) cesium carbide, and (e) mixtures thereof into contact with an alkali metal halide electrolyte of the formula $M^+X^-$ wherein M is selected from the group consisting of Na, K, Li, Rb, Cs, and mixtures thereof, and X is selected from the group consisting of F, Cl, and mixtures thereof;

then contacting said powdered alkali metal carbide with chlorine gas to activate the battery.

16. A method of activating a lithium metal-chlorine gas battery comprising:

placing a mixture of powdered sodium carbide and powdered lithium metal into contact with an alkali metal halide electrolyte of the formula $M^+X^-$ wherein M is selected from the group consisting of Na, K, Li, Rb, Cs, and mixtures thereof and X is selected from the group consisting of F, Cl, and mixtures thereof;

placing pure powdered sodium into contact with the sodium carbide-lithium metal mixture; and finally, contacting the pure sodium carbide and the sodium carbide-lithium metal mixture with chlorine gas to activate the battery.

* * * * *